United States Patent
Raban et al.

(10) Patent No.: US 10,554,629 B2
(45) Date of Patent: Feb. 4, 2020

(54) PUSH BASED ENCRYPTION

(71) Applicant: CHECK POINT SOFTWARE TECHNOLOGIES LTD., Tel Aviv (IL)

(72) Inventors: Yuval Raban, Rehovot (IL); Nadia Goshmir, Binyamina (IL); Shami Reshtik, Givatayim (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 30 days.

(21) Appl. No.: 15/197,783

(22) Filed: Jun. 30, 2016

(65) Prior Publication Data
US 2018/0007012 A1  Jan. 4, 2018

(51) Int. Cl.
*H04L 29/06* (2006.01)
*H04L 29/08* (2006.01)
*H04L 9/16* (2006.01)
*H04W 12/02* (2009.01)

(52) U.S. Cl.
CPC ............ *H04L 63/0428* (2013.01); *H04L 9/16* (2013.01); *H04L 67/26* (2013.01); *H04L 67/34* (2013.01); *H04W 12/02* (2013.01); *H04L 2209/80* (2013.01)

(58) Field of Classification Search
CPC ....... H04L 63/0428; H04L 9/06; H04L 67/26; G06F 8/65
See application file for complete search history.

(56) References Cited

U.S. PATENT DOCUMENTS

| | | | | |
|---|---|---|---|---|
| 9,772,837 | B2* | 9/2017 | Kalidindi | G06F 8/65 |
| 2014/0073291 | A1* | 3/2014 | Hildner | H04L 41/0806 |
| | | | | 455/411 |
| 2014/0215450 | A1* | 7/2014 | Salisbury | G06F 8/60 |
| | | | | 717/170 |
| 2015/0007262 | A1* | 1/2015 | Aissi | G06F 21/60 |
| | | | | 726/2 |
| 2015/0370551 | A1* | 12/2015 | Mahajan | G06F 8/43 |
| | | | | 717/170 |

* cited by examiner

*Primary Examiner* — Wasika Nipa
(74) *Attorney, Agent, or Firm* — Mark M. Friedman

(57) ABSTRACT

A method for introducing a replacement code segment over-the-air through a wireless mobile communication network to an existing code resident on a mobile terminal: identifying the mobile terminal from among terminals served through the wireless mobile communication network; sending a push notification through the network to the mobile terminal, the push notification indicative of the replacement code segment ready for downloading; activating a dynamic update module resident in the mobile terminal, in response to the push notification; sending a request for the replacement code segment; downloading the replacement code segment to the mobile terminal; and transferring the downloaded replacement code segment to the dynamic update module for dynamic replacement of a corresponding old code segment within the mobile terminal with the replacement code segment, obviating a need to recompile the existing code.

11 Claims, 3 Drawing Sheets

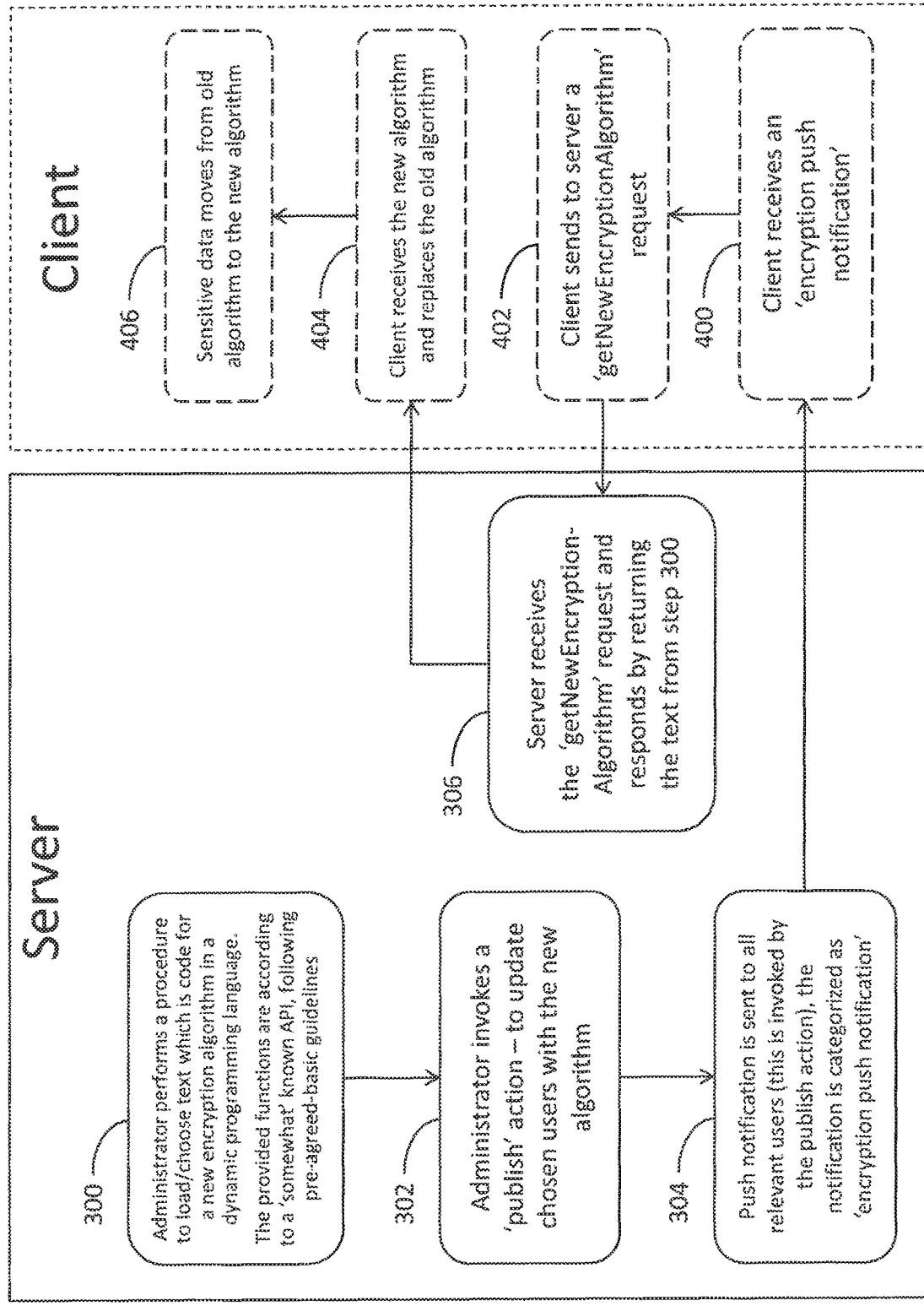

PUSH BASED ENCRYPTION

FIELD OF THE INVENTION

The present invention relates to a "push notifications" for mobile computing devices and, more particularly, to updating an encryption mechanism using a push event.

BACKGROUND OF THE INVENTION

Sensitive data is often saved on mobile devices, and this data is sometimes encrypted. The encryption is usually software based, and hardcoded into the data-containing-software. If the software security mechanisms have been breached, all end users of the same software are vulnerable to attack, as the same security mechanisms are used in the end-user software.

Push technology (also known as a "server push") is a type of Internet-based communication where the request for a given transaction is initiated by a "publisher" or server. It is contrasted with pull technology where the request for transmission of information is initiated by a receiving device or "client."

Push services are sometimes based upon information preferences expressed in advance. This is referred to as a "publish/subscribe" model. For example, a client might subscribe to one or more information "channels." The server associated with the channels can then push information to the client when new content becomes available.

There are many types of push services. For example, synchronous conferencing and instant messaging are forms of push services. Increasingly popular are push-enabled web applications including market data distribution (e.g. stock tickers), online chat/messaging systems (e.g. "webchat"), auctions, online betting and gambling, sports results, monitoring consoles and sensor network monitor.

There are also hybrid push/pull systems. For example, email begins as a push system in that the SMTP protocol upon which it is based is a push protocol. However, the last step in the delivery of an email, e.g. from a mail server to a desktop computer, typically uses a pull protocol such as POP3 or IMAP.

Security updates are common features in application residing on the client. Some applications, like anti-virus applications, are updated on a daily or weekly basis. Other applications, and here we refer mainly to software applications for mobile devices ("mobile apps" or "apps"), are updated on per need basis. For example, an email app or a banking app is only updated once every few months. These updates can include new features, revamping of the GUI, fixes to software bugs and security updates.

With a software 'patch' or update, in most circumstances, the whole program gets updated. For example, the operation could go as follows: (1) Request updates; (2) Download updated files; and (3) Replace current files with the new downloaded files.

Details how to manage aforementioned operation may vary, because, for example, it might not be possible to delete an executable file of a running process, so some form of a workaround may be needed (e.g. run the updater as a separate program instead of the main application or something similar). It could also be possible to simply apply the actual changes between the old file and the new file, instead of downloading the whole file.

There are many different ways to implement a patch or update, but with all the variations, the same basic method is followed, whereby the update process is initiated by the client. The server may send a notification that an update is available, but the client has to request the update or approve the offered update. It is well known that many users ignore the notification to update software, at least for some period of time.

Hackers can exploit the vulnerability between the time the security mechanism or encryption is "hacked" and when the next update is sent and, more importantly, installed on the client device.

SUMMARY OF THE INVENTION

The immediate invention provides a method for changing or introducing new encryption mechanisms into end-user software applications. In preferred embodiments, security mechanisms, such as the encryption algorithm, salt mechanism, hashing functions etc., are updated using an innovative push-based system. The encryption algorithm, for example, is the key generation algorithm, that facilitates the randomness component and other encryption related variables. Fixing or replacing an encryption algorithm, for example, can protect the application owners (both the provider and the consumers) from a widespread data leak if the encryption algorithm or other security mechanism has been defeated.

Three exemplary options for implementing the immediate innovation are considered. The first option is for the immediate method and system serve as a stop-gap solution between discovery of the vulnerability and installation of a new version of the software that includes, among other things, a security update. As a second option, the immediate method and system essentially obviates the need for updates relating to security breaches. That is to say that the immediate method of updating the security mechanism replaces the current method of providing security updates in updated versions of software. The third option is to apply the immediate system and method as a proactive, preventive measure of periodically changing the security mechanisms using the immediate push-based method and system.

According to the present invention there is provided a method for introducing a replacement code segment over-the-air through a wireless mobile communication network to an existing code resident on a mobile terminal, the method including: identifying the mobile terminal from among terminals served through the wireless mobile communication network; sending a push notification through the wireless mobile communication network to a data communication module resident in the mobile terminal, the push notification indicative of the replacement code segment ready for downloading; activating a dynamic update module resident in the mobile terminal, in response to the push notification; initiating a data communication session from the data communication module resident in the mobile terminal, through the wireless mobile communication network; sending a request for the replacement code segment, indicated in the push notification, via the data communication session; downloading the replacement code segment for the mobile terminal to the data communication module resident in the mobile terminal, via the data communication session; and transferring the downloaded replacement code segment to the dynamic update module for dynamic replacement of a corresponding old code segment within the mobile terminal with the replacement code segment, obviating a need to recompile the existing code.

According to further features in preferred embodiments of the invention described below the replacement code segment is a security component.

According to still further features in the described preferred embodiments the replacement code segment includes a replacement encryption algorithm.

According to still further features the update request is sent from the mobile terminal without subsequent approval from a user of the mobile terminal.

According to still further features the replacement code segment includes computer-readable instructions written in a dynamic software language.

According to still further features the replacement code segment is a string of characters and the dynamic update module is configured to render the string of characters into the computer-readable instructions.

According to still further features the mobile terminal includes an analyzer component configured to execute the computer readable instructions.

According to still further features the replacement code segment includes a dynamically loadable library.

According to still further features the method further includes: decrypting data protected by the old code segment using the old code segment; and re-encrypting the data with the replacement encryption algorithm.

According to another embodiment there is provided a method for introducing a replacement code segment over-the-air through a wireless mobile communication network to an existing code resident on a mobile terminal, the method including: receiving a push notification through the wireless mobile communication network to a data communication module resident in the mobile terminal, the push notification indicative of the replacement code segment ready for downloading; activating a dynamic update module resident in the mobile terminal, in response to the push notification; initiating a data communication session from the data communication module resident in the mobile terminal, through the wireless mobile communication network; sending a request for the replacement code segment, indicated in the push notification, via the data communication session; receiving the replacement code segment for the mobile terminal to the data communication module resident in the mobile terminal, via the data communication session; and transferring the downloaded replacement code segment to the dynamic update module for dynamic replacement of a corresponding old code segment within the mobile terminal with the replacement code segment, obviating the need to recompile the existing code.

According to still further features the replacement code segment includes computer-readable instructions written in a dynamic software language.

According to still further features the replacement code segment is a string of characters and the dynamic update module is configured to render the string of characters into the computer-readable instructions.

According to still further features the replacement code segment includes a dynamically loadable library.

According to still further features the method further includes: decrypting data protected by the old code segment using the old code segment; and re-encrypting the data with the replacement code segment.

DEFINITIONS

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned.

The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

The term "linked" as used herein includes both wired or wireless links, either direct or indirect, and placing the computers, including, servers, components and the like, in electronic and/or data communications with each other.

The terms "dynamic programming language", "dynamic language" and variations thereof, as used herein, refers to a class of high-level programming languages which, at run-time, execute many common programming behaviors that static programming languages perform during compilation. These behaviors could include an extension of the program, by adding new code, by extending objects and definitions. Although similar behaviors can be emulated in nearly any language, with varying degrees of difficulty, complexity and performance costs.

The term "library", as used herein, refers to a collection of non-volatile resources used by computer programs, often to develop software. These may include configuration data, documentation, help data, message templates, pre-written code and subroutines, classes, values or type specifications.

"Static library"—The majority of the functionality of a mobile application ("app") is implemented in libraries of executable code. When an app is linked with a library using a static linker, the code that the app uses is copied to the generated executable file. A static linker collects compiled source code, known as object code, and library code into one executable file that is loaded into memory in its entirety at runtime. A library that becomes part of an executable file of an app is known as a static library. Static libraries are collections or archives of object files.

When an app is launched, the code of the app—which includes the code of the static libraries it was linked with—is loaded into the app's address space. When a static library is updated, the client apps that use that static library do not benefit from the improvements made to the library. In order to gain access to the improved functionality of the new version of the library, the developer of the app must link the object files of the app with the new version of the library. The end users of the app have to replace the copy of the app on the end user device with the latest version. This is known as a version update. Therefore, keeping an app up to date with the latest functionality provided by static libraries requires disruptive work by both developers and end users.

"Dynamic library"—Dynamic libraries are not statically linked into client apps, they do not become part of the executable file. Instead, dynamic libraries can be loaded (and linked) into an app either when the app is launched or as it runs. Dynamic libraries are also known as "dynamic shared libraries", "shared objects", or "dynamically linked libraries".

Using dynamic libraries, programs can benefit from improvements to the libraries they use automatically because their link to the libraries is dynamic, not static. That is, the functionality of the client apps can be improved and extended without requiring app developers to recompile the apps.

The term "end-user(s)" is used herein to refer interchangeably to the user, the device (e.g. a smartphone) and both the user and the device. When either the user or the device is specifically referred to, the context of the relevant passage and/or use of terms such as "the user of the device" or "the end-user device" etc., make clear which entity is being referred to. Alternatively or additionally, the terms "mobile terminal device", "mobile device", "mobile terminal" or variations thereof are used interchangeably to refer to the end-user device.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Various embodiments are herein described, by way of example only, with reference to the accompanying drawings, wherein:

FIG. 3 is a schematic flow diagram of the innovative process and method of the immediate invention.

DESCRIPTION OF THE PREFERRED EMBODIMENTS

The principles and operation of a system and method for implementing a push-based encryption according to the present invention may be better understood with reference to the drawings and the accompanying description.

Figure 1:
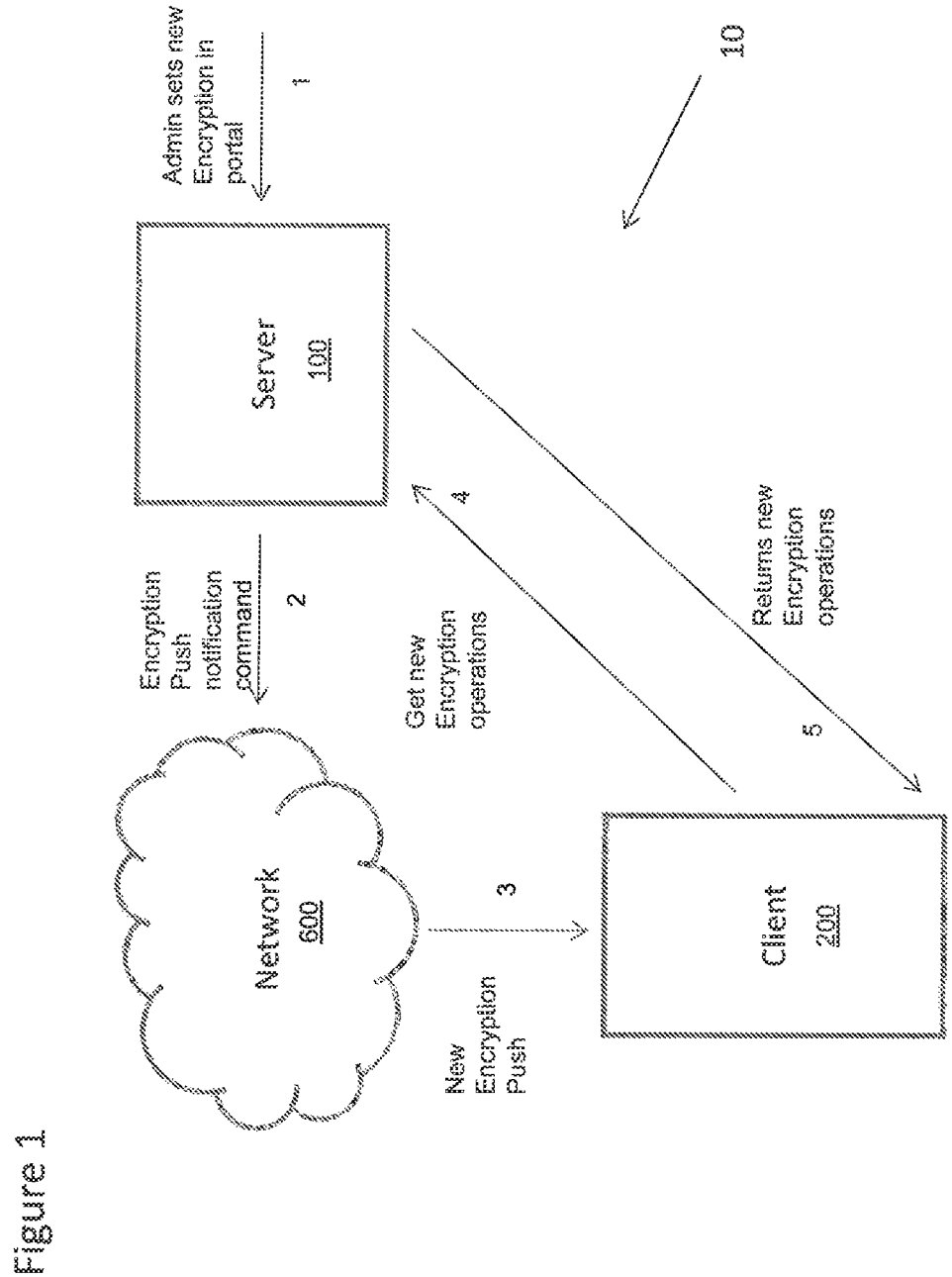
FIG. 1 is a high-level schematic diagram of a system 10 of the immediate invention.

FIG. 1 illustrates a high-level schematic diagram of a system 10 of the immediate invention. The illustrated system 10 implements the innovative method that is described below. In FIG. 1, a server 100 is in electronic communication with a remote client/mobile device terminal 200, via a network 600. It is understood that the general terms "server", "client" and "network" are merely exemplary and not intended to be limiting.

Server 100 represents at least one computer that provides the client with certain services. Client/terminal 200 is an end-user device running an application (or at least having the application installed on the device) that is serviced by server 100. For example, the application may be an email application and server 100 may be an email server that feeds emails to the application and forwards emails from the application. In another example the application is a banking application that allows the end-user to check the status of his or her bank account and perform various operations with regards to that bank account. The server is connected to the banking system and feeds the client application with the relevant banking data. The application that is resident on the mobile terminal device is also referred to herein as "existing code". This existing code is distinguished from a "replacement code segment" which refers to the dynamic code that is replaces (e.g. a Hash function or encryption algorithm). The replacement code segment comes to replace an "old code segment" which refers to the section of the code that is being replaced.

Server 100 may be a 'cloud server', a 'server farm', two or more collocated or remote, interconnected computers and the like. For example, server 100 may refer to an application server and a push server, where the push server pushes notifications to the mobile devices and the application server hosts the updated version of the security code.

Client 200 may be a desktop computer, a laptop computer, a handheld computer such as a tablet computer, a PDA or a combination mobile computing device and cell phone. The application may be a software application (e.g. installed on a desktop or laptop etc.) or a 'mobile application' ('mobile app' or simply 'app') which is specifically designed for the handheld tablet or smartphone. While the following description relates specifically to mobile apps, it is made clear that the immediate system and method can be similarly implemented in desktop and laptop computers and the like.

The client application protects sensitive information (email account details, email contents, bank account numbers, passwords, banking information) under levels of security and encryption. The application connects with the server using identification (user name, account number, etc.) and verification (password, passcode, biometric value, etc.).

Network 600 refers to any computing network such as a company intranet, a LAN, a WLAN, a WAN, a cellular data network, an ad-hoc network, the Internet and the like. While the description below relates to mobile connectivity of handheld devices with application servers over wireless networks via the Internet, it is made clear that any type of wired or wireless connection to any of the aforementioned computing networks is included within the scope of the invention.

One method of implementation of the push-based system of the immediate system includes the following operations. An administrator of the server that services a given application prepares an updated version of software code for the application. Preferably the software code is security code such as a hash function or encryption algorithm etc. The new code is stored on server 100.

Initially, server 100 pushes a notification to the selected end-user devices that have the application on the end-user device. Exemplarily, the notification is a regular push notification to the end user device that is sent by server 100 to client 200 via network 600. The push notification includes computer-readable instructions that instruct the end-user device to request the new/replacement code from server 100. The push notification is also referred to herein as an "encryption push notification". In most cases, server 100 comprises an application server and a push server. The application server receives the new code and passes the code to the push server that actually effects the push to the client devices.

Next, client 200 sends the request to server 100 for the new code. Server 100 transmits the new code to client 200. Preferably, the code is sent as a string of characters. Preferably the code is written in a dynamic language, e.g. Java Script®.

The terminal device 200 downloads the replacement code. The sensitive data is moved over from being secured by the old code to being secured by the replacement code. The old code segment is replaced with the replacement code segment. There is not compilation of the "updated" code. The method will be discussed in further detail below.

Figure 2:
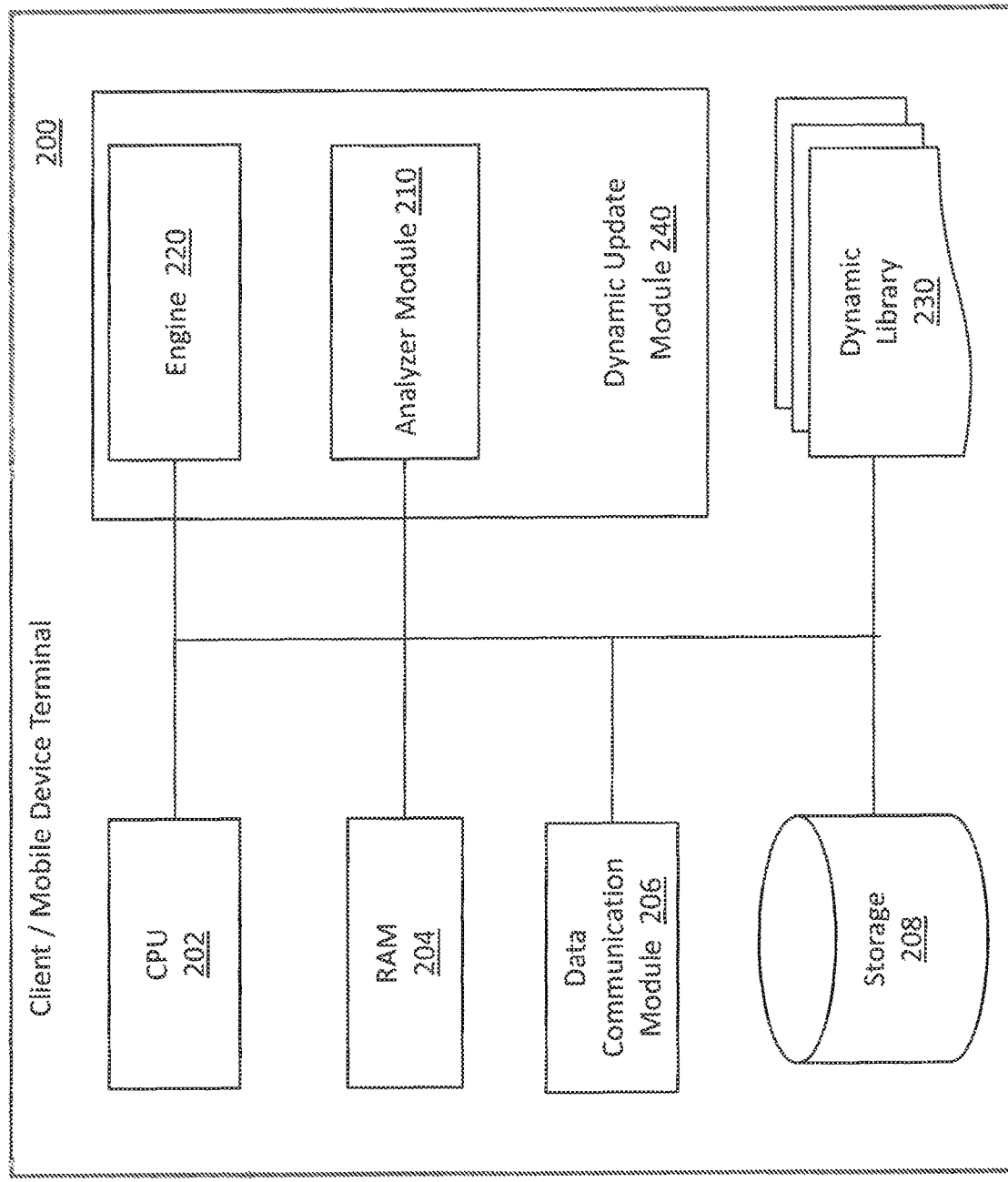
FIG. 2 is a block diagram of a client 200 of system 10.

FIG. 2 illustrates a block diagram of a client 200 of system 10. The figure only includes components that are germane to the invention, but it is made clear that other components necessary for the function of the device are also present. Client 200 includes a central processing unit (CPU) 202, memory 204 such as RAM and non-volatile storage 208.

The client device on which the immediate application is installed includes an analyzer module 210 (also referred to elsewhere as "PushEncryptionAnalyzer") which is a software component that parses the downloaded string into code and either upgrades the existing code (if needed or even possible) or stores the data for later use. Analyzer module 210 is embodied on non-transient storage media and comprises computer-readable program code.

In preferred embodiments, the downloaded code is written in a dynamic language, and is therefore not compiled, but rather sent to an engine 220 that is adapted and configured to execute the code as is. For example, JavaScript code is a dynamic language code that can be run in iOS™ using JavaScriptCore framework as an engine.

In another embodiment, the downloaded code is alternatively or additionally a dynamic library 230 and stored on client 200. The dynamic library includes an updated collection of non-volatile resources that the app uses. The dynamic library is linked to the application at launch or when needed, as such, the dynamic library can be updated without needing to recompile the application and without needing to request approval from the end-user to install the update.

The following scenario illustrates one type of problem that the immediate innovative method and system provide a solution for. Recently, a cryptographic hash function named "MD5" was found to be a relatively weak and vulnerable algorithm that does not provide the desired or necessary encryption strength. System administrators who have applications that use the MD5 security mechanism need to replace the mechanism with a better Hash function. Until now, the only way to replace such an algorithm would be to prepare an updated version of the application with the new hash function. The end-users having a registered application would then be notified that a new version of the app is available. It would then be up to each end-user to download and install the new version.

Unfortunately, a version update or new build is not expected to be implemented by 100% of the users on 100% of the devices. The working premise is that only a portion of the end-users will install the update while at least some users will only run the initial version of the application that they installed. I.e. some users do not install any updates whatsoever. Furthermore, even those users who do install version updates, not all of them install the updates in a timely manner. In the meantime, until the new version is installed (if at all), the sensitive data protected by the application, and possibly the end user device itself, is vulnerable to exploitation of the weak security mechanism in the old version.

One potential method for ensuring installation of new versions of software is for the developers of the client application to initially code into the application to contact the server on a regular basis and request and install an updated version of the app (e.g. in the same way that a virus signature database is updated on a regular basis when launched). Unfortunately, the process of constantly initiating a version update from the server (even if there is no update available) is battery consuming, time consuming (the app will take much longer to launch), eats up bandwidth (which translates to money in most cases where bandwidth is limited) and not at all justified, seeing as apps may only be updated once or twice a year.

Even if a new version is downloaded, the end user will still have to approve installing the new version. Most users, when prompted with the question "Do you want to install the new version of the app?" (or similar notification), push the "cancel" button, not the "Ok" button. As a result of this common behavior, there is a perpetual question that plagues programmers the world over: "when will the last user stop using the old version of the product?" The immediate procedure, method and system answers that question. The push notification of the push-based system of the immediate invention obviates the need to query the server for updates of this type on regular basis. Furthermore, the administrator is able to upgrade or replace the same encryption algorithm in all of the client devices at substantially the same time. Security mechanisms such as the encryption algorithm would be allowed to be updated in the push-based manner described here, without the end-user approving the downloading and installing, as both the downloading phase and installation phase are effected automatically, and without recompiling or reinstalling the software. Furthermore, fixing security vulnerabilities is both time sensitive and beneficial to the end-user.

The innovative process is now discussed in detail. It is made clear that the description provided hereafter refers to both the system (above) and the method (below). The innovative method and system includes two main components which are implemented in two separate stages. The first component is the push notification component which is effected in the notification stage. The second component is implementing the new code which is effected in the encryption update stage.

FIG. 3 illustrates a schematic flow diagram of the innovative process and method of the immediate invention. When an administrator decides to upgrade or replace a security mechanism on the client programs in the end-user devices, the administrator or developer provides a new code in a dynamic programming language or an updated dynamic library. Thus, in step 300 the Administrator of the end-user application, e.g. a mobile app installed on a smartphone (end-user), selects a new security feature (e.g. an encryption algorithm) to use in the end-user applications. The new algorithm is set in the server. The new code/library may include one or more security features such as, but not limited to: an encryption algorithm, a salt mechanism, a hashing function and the like.

In the first stage, the push notification stage, implementation of the update is initiated by first pushing a notification to all the end-user devices that have the relevant app or apps installed thereon. In step 302 the selected mobile terminals are identified among all the terminals served through the wireless mobile communication network.

In step 304, the administrator server, or another computer which is a push server that is linked to the main server (e.g. administrator server), sends out a push notification over a network (e.g. wireless mobile communication network) to the end-user devices (mobile device terminals). The notifications are 'pushed' over the network to the end-users over, for example, a cellular data network connected to the Internet. The notification is categorized as 'encryption push notification'.

In FIG. 1 a single Server is depicted, this embodiment is merely exemplary and not intended to be limiting. It is made clear, here and elsewhere, that the "Server" of FIG. 1 may represent one or more computers, e.g. such as an Administrator Server (which may house the replacement code, among other things) and a Push Server (which sends the push notifications to the selected mobile terminal devices.

The network may be a private network such as a LAN or VPN, or the network may be a public network, a mobile communications network or network of networks such as the Internet, etc., as discussed above.

Looking at the client/mobile terminal side, in step 400, the end-user device/mobile terminal receives this push notification which, e.g. through the wireless mobile communication network, where the push notification is indicative of the replacement code segment ready for downloading. In one embodiment, a data communication module 206 resident in the mobile terminal, receives the push notification.

The push notification, among other things, indicates that a specific replacement code segment that is currently ready on the server for downloading. The push notification is in the form of a string of characters. The string is parsed and notification is rendered into instructions, computer-readable instructions, that instruct the mobile device to send a request for the replacement code segment, indicated in the push notification.

In one embodiment a dynamic update module 240, resident in the mobile terminal, is activated in response to the push notification. The dynamic update module 206 is responsible for the entire dynamic update process, on the client/device terminal side. In preferred embodiments, the dynamic update module 240 parses the string and sends the request for the replacement code (also called "replacement code segment") to the server.

In step 402 the client terminal sends a request for the new encryption algorithm to the server. For example, the user device may send a request to the server labeled 'getNewEncryptionAlgorithm'. In preferred embodiments, the update request is sent from the mobile terminal without subsequent approval from a user of the mobile terminal. This does not negate the option of the user approving the use of the dynamic update module at an initial installation or the like. In preferred embodiments, as mentioned above, the client device/mobile terminal includes a data communication module 206. The data communication module initiates a data communication session through the wireless mobile communication network (or other network). The request for the replacement code segment, that was indicated in the push notification, is sent via the data communication session.

Looking back at the server side, in step 306 the server receives the 'getNewEncryptionAlgorithm' request from the client, including the necessary identification and/or verification data needed to verify that the end-user is legitimate. In step 308 the server sends the replacement code segment, e.g. an encryption algorithm, to the client that sent the request in step 402.

In step 404 the updated or replacement security code is downloaded to the end user device, e.g. as a string. The code is sent, as is known in the art, over a secure link (e.g. SSL) with the appropriate gateway, authentication etc. The replacement code segment for the mobile terminal is downloaded to the data communication module 206 resident in the mobile terminal, e.g. via the data communication session.

The string is rendered into code. The code is written in a dynamic language. Only an app and/or device that has dynamic code running capabilities is/are able to run the new code. Alternatively, the new code is in the form of a dynamic library. Only an app that is configured to utilize dynamic libraries for the specific, security functions is able to utilize the updated dynamic library. Finally the client utilizes dynamic code running capabilities and/or dynamic library to reset the internal security parameters of the software.

For example, in one embodiment, the aforementioned process is performed when the downloaded replacement code segment is transferred to the dynamic update module 240 for dynamic replacement of a corresponding old code segment within the mobile terminal with the replacement code segment. Replacing the old dynamic code with the replacement code segment obviates the need to recompile the existing code.

As such, a further distinction between a version update procedure and the immediate push-based procedure is that the push-based procedure does not replace the entire application with a new version or 'build' but rather replaces the specific section or lines of code with the new code (e.g. a different encryption or hash algorithm etc.). Also, the code does not need to be recompiled, which would be the case with a version update. So there is no need to uninstall the old version and install the new version in its place.

One example may include the administrator writing a new encryption algorithm in JavaScript® (which is a dynamic language) that will be pushed during the encryption update phase. The new JavaScript® function contains predetermined names for the client software on the end user device to parse, and use. For example, the existing encryption algorithm may be AES128 or hash function MD5, which needs to be replaced with the new or different algorithm. The client application on the end user device includes an analyzer component (e.g. analyzer module 210 of FIG. 2) that is capable of processing the downloaded code. The new software code, which is written in a dynamic language, is processed by the analyzer component in order to replace the old component without having to recompile and/or rebuild the whole code.

Code in a dynamic language is not compiled but rather sent to an engine (e.g. engine 220, of FIG. 2) that can run the dynamic code. One example of an engine in iOS that can run JavaScript® code is JavaScriptCore framework. Both Analyzer Module 210 and Engine 220 are part of the Dynamic Update Module 240. Once the new component is in place, in step 406, all the protected data in the application is decrypted using the old algorithm/component and re-encrypted using the new algorithm/component.

In another embodiment, the replacement code is prepared by the administrator as a dynamic library. The end user device requests and downloads the library which is then dynamically loaded to memory when the security functions in the library need to be executed. In such a case, the code of the app does not need to be compiled but rather the library is loaded when the app is launched or when the functionality is need (as discussed above in detail).

The analyzer component is further responsible for the upgrade process of the software, if needed. The upgrade process includes decrypting the secured data with the old encryption mechanism and re-encrypting that data with the new mechanism.

If at some stage it becomes possible to push a large amount of data, then the entire block of replacement code can be pushed to the devices at the initial push [notification] step.

Alternatively, if it becomes possible to super-compact the code into the relatively small amount of characters allowed in a push notification string, then the super-compact string of code can be pushed at the initial 'push step', as above.

Moreover, the push can notify on a configuration change. The client/mobile terminal will fetch from the server a configuration dictionary (map of keys and values) that contains parameters which define the program's security.

For example, PBKDF2 (Password-Based Key Derivation Function 2) receives the number of iterations the function must perform, the recommendations for the number of iterations change periodically according to CPU improvements in the market. Once a change in the number of iterations is recommended, the mobile device terminal will get a push, ask for the configuration dictionary, will receive, for example, [number of iterations for PBKDF2<->64,000] which will be implemented into the code and thereby align the application with the current standard.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method for introducing a replacement code segment over-the-air through a wireless mobile communication network to an existing code resident on a mobile terminal, the method comprising:
   (a) identifying the mobile terminal from among terminals served through the wireless mobile communication network;
   (b) sending a push notification through the wireless mobile communication network to a data communication module resident in the mobile terminal, said push notification indicative of the replacement code segment ready for downloading, the replacement code segment being computer-readable instructions written in an interpreted language;
   (c) activating a dynamic update module resident in the mobile terminal, in response to the push notification, wherein said dynamic update module breaks up a string of characters in said push notification into words which are recognized by said dynamic update module as instructions to automatically and without subsequent user approval:
      (i) initiate a data communication session from said data communication module resident in the mobile terminal, through the wireless mobile communication network;
      (ii) send a request for the replacement code segment, indicated in said push notification, via said data communication session; and
      (iii) download the replacement code segment for the mobile terminal to the data communication module resident in the mobile terminal, via said data communication session; and
   (d) transferring the downloaded replacement code segment to said dynamic update module for dynamic replacement of a corresponding old code segment within the mobile terminal with the replacement code segment, obviating a need to recompile the existing code.

2. The method of claim 1, wherein the replacement code segment is a security component.

3. The method of claim 1, wherein the replacement code segment includes a replacement encryption algorithm.

4. The method of claim 1, wherein said replacement code segment is a string of characters and said dynamic update module is configured to render said string of characters into said computer-readable instructions.

5. The method of claim 4, wherein the mobile terminal includes an analyzer component configured to execute said computer readable instructions.

6. The method of claim 1, wherein said replacement code segment includes a dynamically loadable library.

7. The method of claim 3, further comprising:
   decrypting data protected by said old code segment using said old code segment; and
   re-encrypting said data with said replacement encryption algorithm.

8. A method for introducing a replacement code segment over-the-air through a wireless mobile communication network to an existing code resident on a mobile terminal, the method comprising:
   (a) receiving a push notification through the wireless mobile communication network to a data communication module resident in the mobile terminal, said push notification indicative of the replacement code segment ready for downloading, the replacement code segment being computer-readable instructions written in an interpreted language;
   (b) activating a dynamic update module resident in the mobile terminal, in response to the push notification, wherein said dynamic update module breaks up a string of characters in said push notification into words which are recognized by said dynamic update module as instructions to automatically and without subsequent user approval:
      (i) initiate a data communication session from said data communication module resident in the mobile terminal, through the wireless mobile communication network;
      (ii) send a request for the replacement code segment, indicated in said push notification, via said data communication session; and
      (iii) receive the replacement code segment for the mobile terminal to the data communication module resident in the mobile terminal, via said data communication session; and
   (c) transferring the downloaded replacement code segment to the dynamic update module for dynamic replacement of a corresponding old code segment within the mobile terminal with the replacement code segment, obviating the need to recompile the existing code.

9. The method of claim 8, wherein said replacement code segment is a string of characters and said dynamic update module is configured to render said string of characters into said computer-readable instructions.

10. The method of claim 8, wherein said replacement code segment includes a dynamically loadable library.

11. The method of claim 8, further comprising:
   decrypting data protected by said old code segment using said old code segment; and
   re-encrypting said data with said replacement code segment.

* * * * *